United States Patent
Masuyama

(10) Patent No.: US 9,635,241 B2
(45) Date of Patent: Apr. 25, 2017

(54) IMAGE CAPTURING APPARATUS AND METHOD OF CONTROLLING IMAGE CAPTURING APPARATUS

(71) Applicant: CANON KABUSHIKI KAISHA, Tokyo (JP)

(72) Inventor: Kimihiro Masuyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/847,618

(22) Filed: Sep. 8, 2015

(65) Prior Publication Data

US 2016/0073008 A1    Mar. 10, 2016

(30) Foreign Application Priority Data

Sep. 9, 2014 (JP) ................ 2014-183496

(51) Int. Cl.
*H04N 5/232* (2006.01)
*H04N 5/3745* (2011.01)
*H04N 5/369* (2011.01)

(52) U.S. Cl.
CPC ....... *H04N 5/23212* (2013.01); *H04N 5/3696* (2013.01); *H04N 5/37452* (2013.01); *H04N 5/37457* (2013.01)

(58) Field of Classification Search
CPC ............ H04N 5/23212; H04N 5/3696; H04N 5/37452; H04N 5/37457
USPC ........................................................ 348/349
See application file for complete search history.

(56) References Cited

U.S. PATENT DOCUMENTS

2011/0199506 A1* 8/2011 Takamiya ................ G02B 7/34
                                                                 348/222.1
2013/0076972 A1* 3/2013 Okita ................ H04N 5/23212
                                                                 348/360

FOREIGN PATENT DOCUMENTS

JP        2010-259027 A    11/2010

* cited by examiner

*Primary Examiner* — Nhan T Tran
*Assistant Examiner* — Chan Nguyen
(74) *Attorney, Agent, or Firm* — Cowan, Liebowitz & Latman, P.C.

(57) ABSTRACT

In an image capturing apparatus having an image sensor including a plurality of unit pixels each having a plurality of photoelectric conversion portions and a microlens, the image sensor can be scanned with a first scan method of adding and reading out signals from a portion of the photoelectric conversion portions by a predetermined number of unit pixels and with a second scan method of adding and reading out signals from the photoelectric conversion portions by the predetermined number of unit pixels. A pixel signal read out with the second scan method is selected if a defocus amount is larger than a threshold value and the larger of the pixel signal read out with the second scan method and a signal obtained by using the pixel signal read out with the first scan method is selected if the defocus amount is equal to the threshold value or less.

10 Claims, 8 Drawing Sheets

F I G. 6
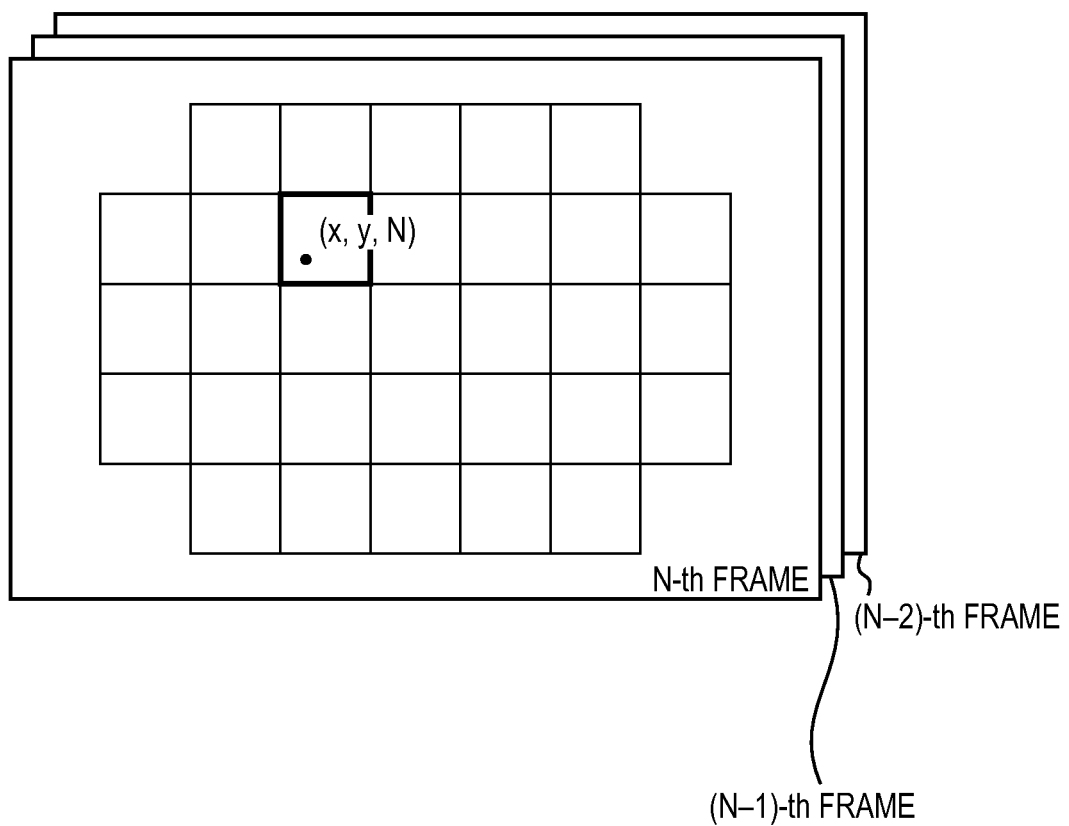

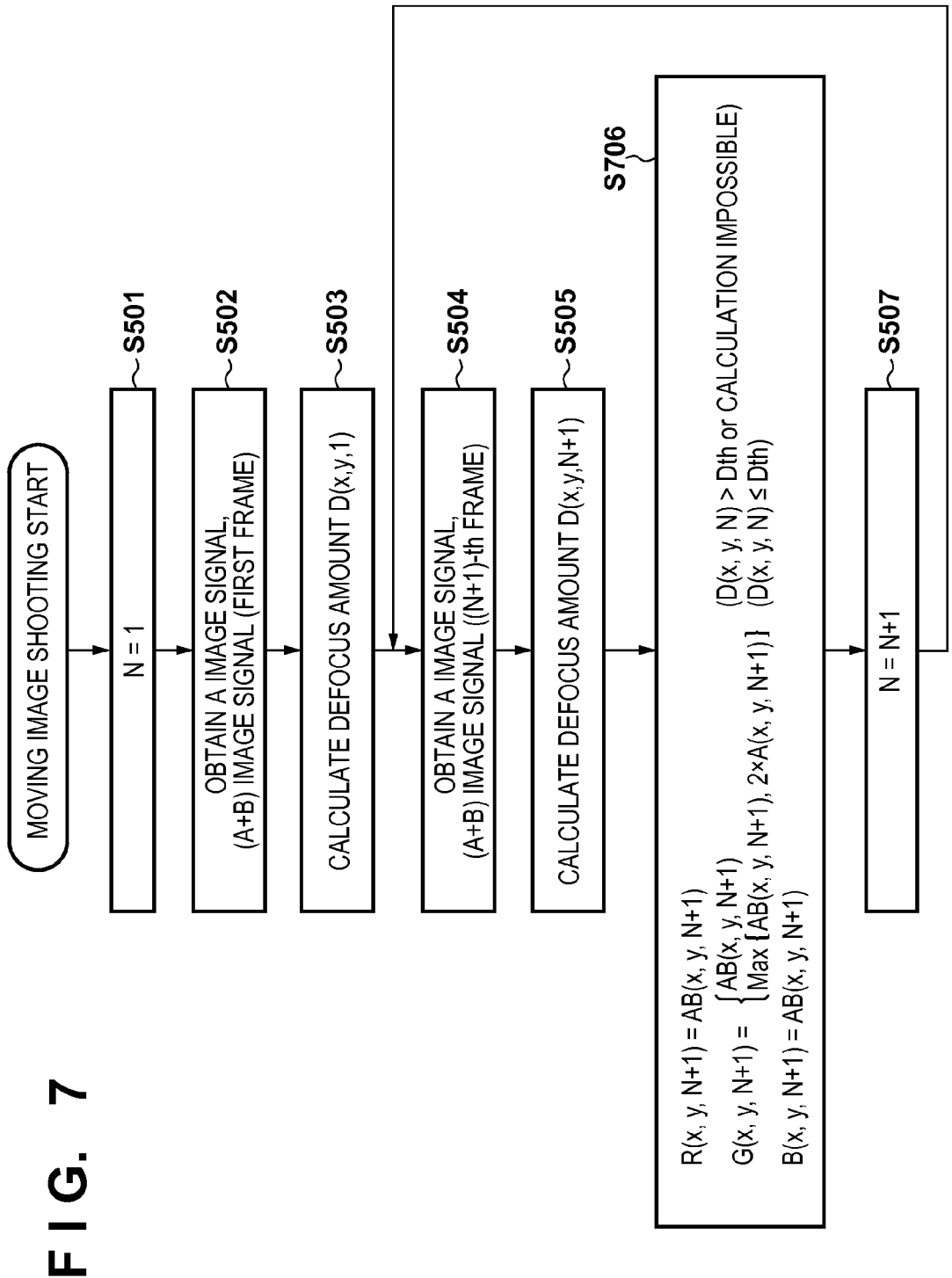

FIG. 8

| FRAME | | | | FINAL IMAGE SIGNAL IN N-th + 1 FRAME |
|---|---|---|---|---|
| N-3 | N-2 | N-1 | N | $P(x, y, N+1)$ |
| − | − | − | × | $AB(x, y, N+1)$ |
| − | − | × | ○ | $\mathrm{Max}\{AB(x, y, N+1), \dfrac{2 \times AB(x, y, N+1) + 2 \times A(x, y, N+1)}{3}\}$ |
| − | × | ○ | ○ | $\mathrm{Max}\{AB(x, y, N+1), \dfrac{AB(x, y, N+1) + 4 \times A(x, y, N+1)}{3}\}$ |
| − | ○ | ○ | ○ | $\mathrm{Max}\{AB(x, y, N+1), 2 \times A(x, y, N+1)\}$ |

− : DON'T CARE

○ : DEFOCUS AMOUNT AT COORDINATES (x,y) IN CORRESPONDING FRAME IS Dth OR LESS

× : DEFOCUS AMOUNT AT COORDINATES (x,y) IN CORRESPONDING FRAME IS LARGER THAN Dth OR CALCULATION IMPOSSIBLE

IMAGE CAPTURING APPARATUS AND METHOD OF CONTROLLING IMAGE CAPTURING APPARATUS

BACKGROUND OF THE INVENTION

Field of the Invention

The present invention relates to an image capturing apparatus and a method of controlling an image capturing apparatus.

Description of the Related Art

In recent years, in image capturing apparatuses such as a digital video camera and a digital still camera, imaging with a high number of pixels and at high frame rates due to high-speed readout has become possible following improvements in image sensor sensitivity, enhancements in image processing, and increases in memory capacity. Imaging at a high frame rate has various benefits such as an increase in AF speed and improvements in video quality, and further increases in frame rate are in demand.

On the other hand, a pixel arithmetic averaging method is known as a pixel reduction method for capturing a moving image with a comparatively low number of pixels at a high frame rate using an image capturing apparatus with a high number of pixels. In the pixel arithmetic averaging method, the data rate is reduced and a high frame rate is realized by performing arithmetic averaging on multiple pixels in a specific cycle in the image sensor. Japanese Patent Laid-Open No. 2010-259027 discloses the output of the arithmetic average of image signals from multiple rows by using a row selection circuit to select and output signals from multiple pixel rows at the same time.

However, in the case in which multiple pixel rows are selected simultaneously and connected, there are cases in which the dynamic range can no longer be ensured. This issue becomes prominent particularly in cases in which there is a large difference in signals between simultaneously connected pixels. For this reason, in Japanese Patent Laid-Open No. 2010-259027, the dynamic range is ensured by increasing the current value for driving the pixels that perform signal output according to the number of rows simultaneously connected, and raising the driving capacity of the amplifier circuit. However, there is an issue of an increase in power consumption during readout due to the raising of the current value for driving the pixels.

SUMMARY OF THE INVENTION

The present invention has been made in consideration of the above situation, and in an image capturing apparatus, realizes high-speed readout while also suppressing deterioration in image quality without increasing power consumption.

According to the present invention, provided is an image capturing apparatus comprising: an image sensor including a plurality of unit pixels each having a plurality of photoelectric conversion portions for one out of a plurality of microlenses; a readout unit configured to be capable of reading out pixel signals by scanning the image sensor with a first scan method of adding and reading out signals from a portion of the plurality of photoelectric conversion portions by a predetermined number of unit pixels, and a second scan method of adding and reading out signals from the plurality of photoelectric conversion portions by the predetermined number of unit pixels; a detection unit configured to obtain a defocus amount; and a selection unit configured to select, for each read out pixel signal, a pixel signal read out with the second scan method in a case in which the defocus amount is larger than a predetermined threshold value, or a larger signal out of the pixel signal read out with the second scan method and a signal obtained by using the pixel signal read out with the first scan method in a case in which the defocus amount is less than or equal to the predetermined threshold value.

According to the present invention, provided is a method of controlling an image capturing apparatus that has an image sensor including a plurality of unit pixels each having a plurality of photoelectric conversion portions for one out of a plurality of microlenses, the method comprising: reading out pixel signals by scanning the image sensor with a first scan method of adding and reading out signals from a portion of the plurality of photoelectric conversion portions by a predetermined number of unit pixels; reading out pixel signals by scanning the image sensor with a second scan method of adding and reading out signals from the plurality of photoelectric conversion portions by the predetermined number of unit pixels; obtaining a defocus amount; and selecting, for each read out pixel signal, a pixel signal read out with the second scan method in a case in which the defocus amount is larger than a predetermined threshold value, or a larger signal out of the pixel signal read out with the second scan method and a signal obtained by using the pixel signal read out with the first scan method in a case in which the defocus amount is less than or equal to the predetermined threshold value.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 6 is a conceptual diagram showing the relation between a pixel and a defocus region according to the embodiment;

FIG. 7 is a flowchart showing processing according to a second embodiment; and

FIG. 8 is a diagram showing conditions for calculating a pixel signal according to a third embodiment.

DESCRIPTION OF THE EMBODIMENTS

Exemplary embodiments of the present invention will be described in detail in accordance with the accompanying drawings. Note that in the diagrams used for the following descriptions, the same components are shown with the same reference numbers.

First Embodiment

Figure 1:
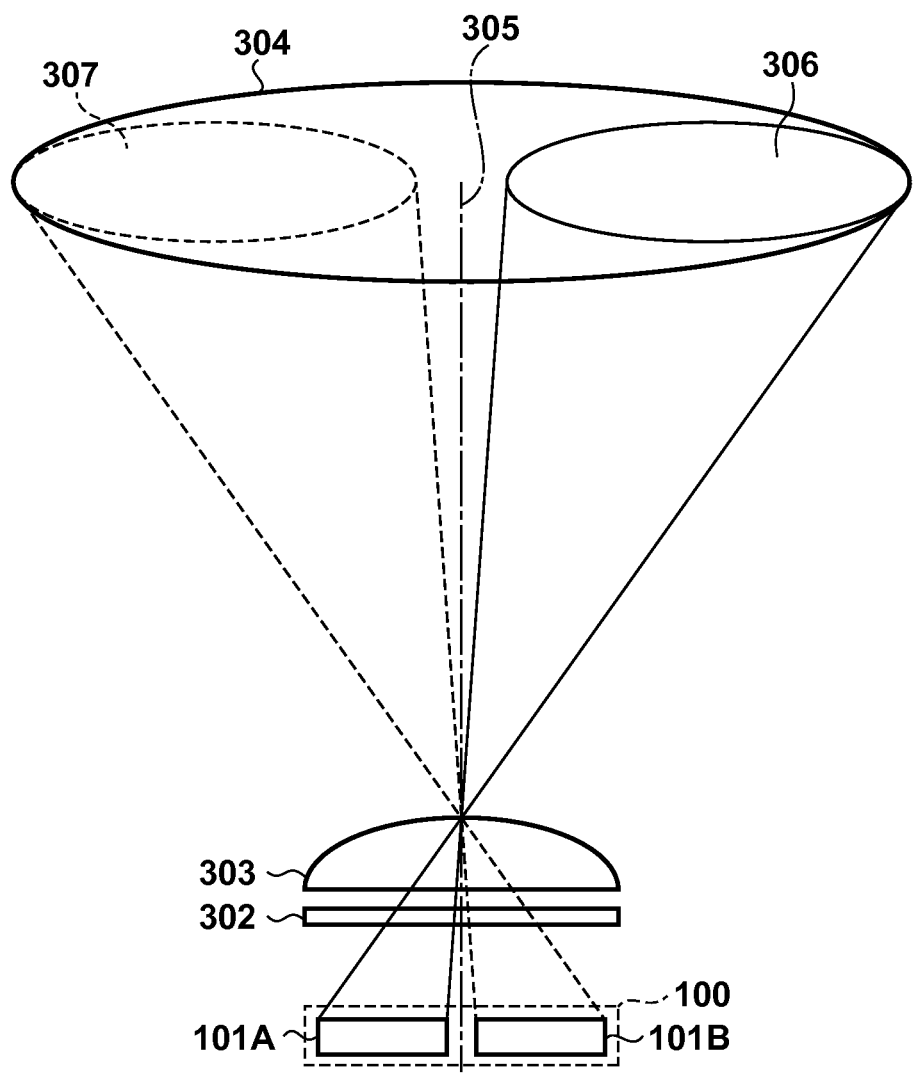
FIG. 1 is a diagram showing a conceptualization of luminous flux that has exited an exit pupil of an imaging lens of an image capturing apparatus, and is entering a unit pixel according to an embodiment of the present invention.

First, the principles by which a phase difference detection method type of focus detection is realized in a normal image sensor for capturing a subject image will be described. FIG. 1 is a diagram that schematically shows a situation in which luminous flux that has exited from an exit pupil of an imaging lens is incident on one unit pixel of the image sensor. A unit pixel 100 has a first photodiode (PD) 101A and a second photodiode (PD) 101B, and is covered by a color filter 302 and a microlens 303.

The center of an exit pupil 304 of the imaging lens is an optical axis 305 with regards to a pixel that has the microlens 303. Light that has passed through the exit pupil 304 enters the unit pixels 100 with the optical axis 305 as the center. Also, as shown in FIG. 1, luminous flux that passes through a pupil region 306, which is a portion of the region of the exit pupil 304 of the imaging lens, is received by the first PD 101A through the microlens 303. Similarly, luminous flux that passes through a pupil region 307, which is a portion of the region of the exit pupil 304, is received by the second PD 101B through the microlens 303. Accordingly, the first PD 101A and the second PD 101B each receive light that has passed through separate regions of the exit pupil 304. Accordingly, phase difference detection can be performed by comparing signals from the first PD 101A and the second PD 101B.

Hereinafter, a signal obtained from the first PD 101A is to be called an A image signal and a signal obtained from the second PD 101B is to be called a B image signal. Also, a signal in which the signal from the first PD 101A and the signal from the second PD 101B are added and read out is an (A+B) image signal and can be used to capture images.

Figure 2:
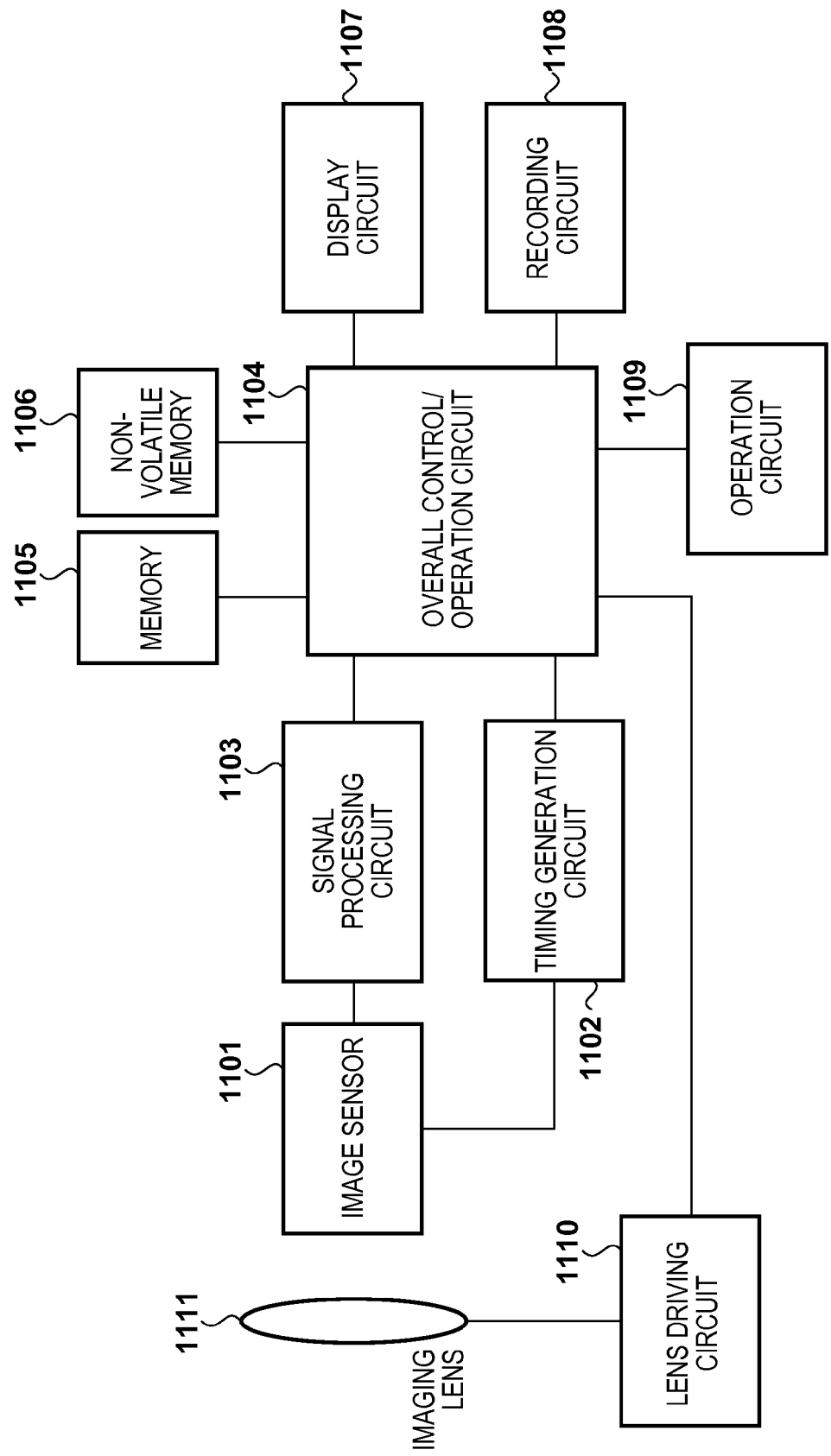
FIG. 2 is a block diagram showing a functional configuration of the image capturing apparatus according to the embodiment.

Next, a block diagram in FIG. 2 shows a configuration of the image capturing apparatus according to the first embodiment. Zoom control, focus control, aperture control, and the like are performed on an imaging lens 1111 by a lens driving circuit 1110, and an optical image of a subject is formed on an image sensor 1101. Multiple unit pixels 100 that have the configuration shown in FIG. 1 are arranged in a matrix in the image sensor 1101, and the subject image formed on the image sensor 1101 is converted into an electrical image signal and output from the image sensor 1101. A signal processing circuit 1103 performs various types of correction on the image signal output from the image sensor 1101, and compresses data. Also, the signal processing circuit 1103 generates the B image signal as the differential signal between the A image signal and the (A+B) image signal obtained from the image sensor 1101.

A timing generation circuit 1102 outputs a timing signal for driving the image sensor 1101. An overall control/operation circuit 1104 performs various types of operations, and controls overall operations of the image capturing apparatus including operations of the image sensor 1101. The overall control/operation circuit 1104 furthermore performs the phase difference detection method type of focus state detection operations using the A image signal and the B image signal, and also calculates the amount of defocus. Image data that the signal processing circuit 1103 outputs is temporarily stored to a memory 1105. A non-volatile memory 1106 stores programs, various types of threshold values, adjustment values that are different for each image capturing apparatus, and the like. A display circuit 1107 displays various types of information and captured images. A recording circuit 1108 is a circuit that performs reading and writing from and to a removable recording medium, such as a semiconductor memory, for performing the recording or reading out of image data. An operation circuit 1109 includes an input device group typified by a switch, a button, a touch panel, and the like, and receives user instructions for the image capturing apparatus.

Figure 3:
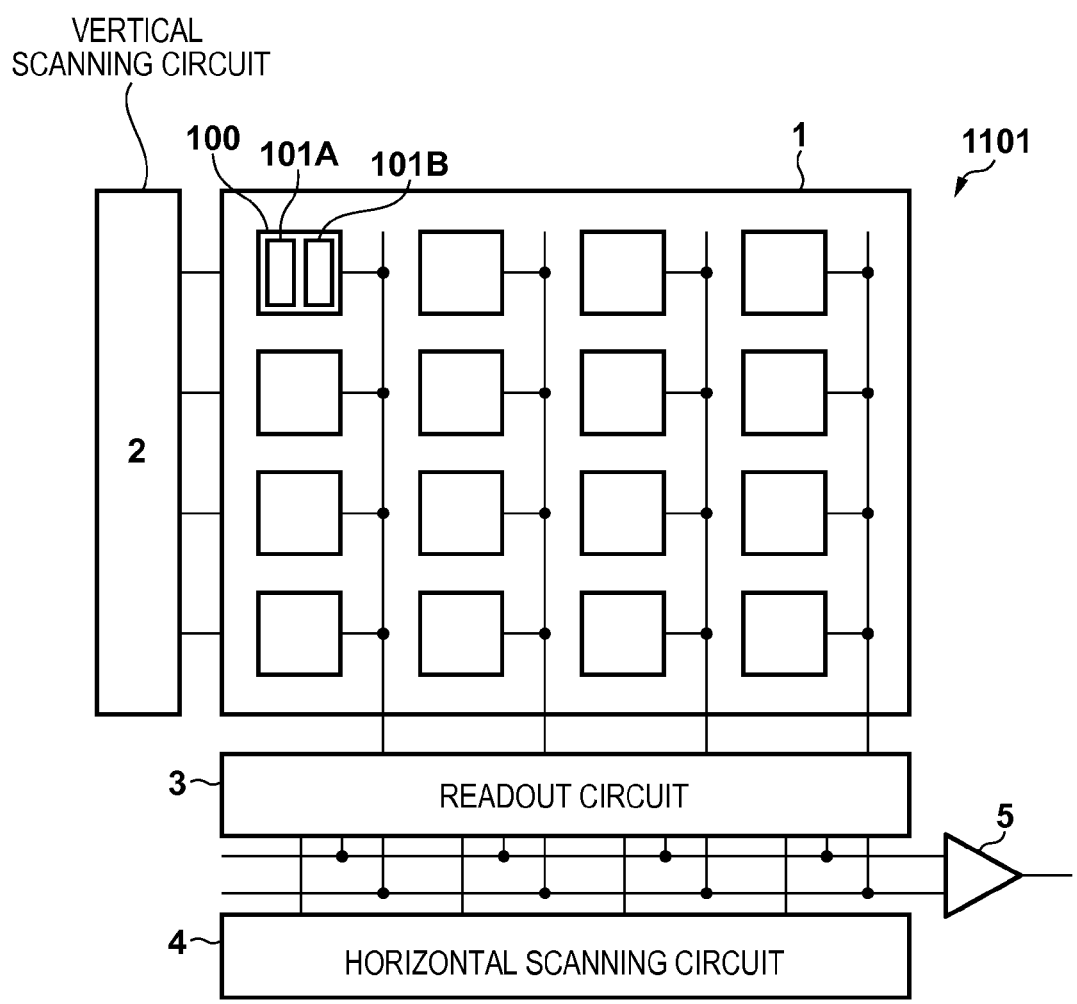
FIG. 3 is a diagram showing a configuration of an image sensor according to the embodiment.

Next, an example of the configuration of the image sensor 1101 will be described using FIG. 3 and FIG. 4. FIG. 3 is a diagram that shows an example of an overall configuration of the image sensor 1101. The image sensor 1101 includes a pixel region 1, a vertical scanning circuit 2, a readout circuit 3, a horizontal scanning circuit 4, and an output amplifier 5. Multiple unit pixels 100 are arranged in a matrix in the pixel region 1. Here, 16 pixels arranged 4×4 are shown for ease of description, but actually, a million or more unit pixels are arranged in a matrix. As shown in FIG. 1, each unit pixel 100 includes the first PD 101A and the second PD 101B. In the present embodiment, the vertical scanning circuit 2 selects pixels in the pixel region 1 in units of one row, and sends out a driving signal to the pixels in the selected row. The readout circuit 3 includes a column readout circuit for each column, and amplifies the output signal from the unit pixels 100 and performs sample-holding of the output signal. The horizontal scanning circuit 4 sends out a signal for successive output of the signal sample-held by the readout circuit 3 to the output amplifier 5 for each column. The output amplifier 5 outputs the signal that was output from the readout circuit 3 to the signal processing circuit 1103 by the operation of the horizontal scanning circuit 4. The vertical scanning circuit 2, the readout circuit 3, and the horizontal scanning circuit 4 are driven by a timing signal from the timing generation circuit 1102.

Figure 4:
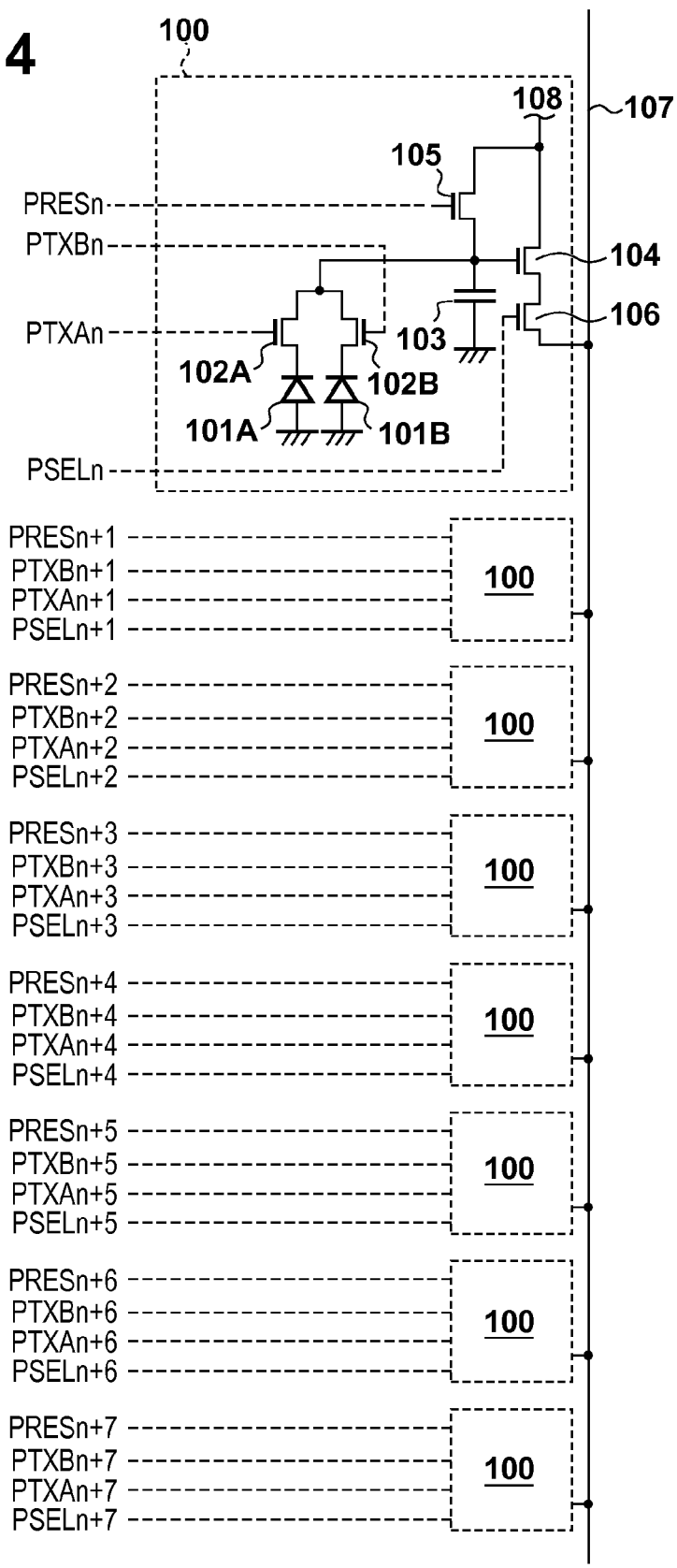
FIG. 4 is a circuit diagram of a unit pixel of the image capturing apparatus according to the embodiment.

FIG. 4 is a circuit diagram that shows an example of a configuration of unit pixels 100 that have been connected in an arbitrary column. The following is a description of the pixel circuit of row n, but the unit pixels 100 that follow from row n+1 onward have a similar configuration, and therefore their configurations are not shown in the diagram. Regarding the driving signal, to differentiate the rows, a row number suffix is attached to each driving signal.

A first transfer switch 102A and a second transfer switch 102B are respectively connected to the first PD 101A and the second PD 101B. Also, the output of the first transfer switch 102A and the second transfer switch 102B is connected to an amplifier 104 through a floating diffusion (FD) region 103. A reset switch 105 is connected to the FD region 103, and a selection switch 106 is connected to the source of the amplifier 104.

The first PD 101A and the second PD 101B receive light that has passed through the same microlens 303, and function as a photoelectric conversion portion that generates a signal charge that corresponds to the amount of light received. The first transfer switch 102A and the second transfer switch 102B function as a transfer unit that transfers the charge generated by the first PD 101A and the second PD 101B to the common FD region 103. Also, the first transfer switch 102A and the second transfer switch 102B are respectively controlled by transfer pulse signals PTXAn and PTXBn from the vertical scanning circuit 2.

The FD region 103 temporarily holds the charge transferred from the first PD 101A and the second PD 101B, and functions as a charge/voltage conversion unit that converts the held charge into a voltage signal. The amplifier 104 is a source follower MOS transistor that amplifies the voltage signal converted by the FD region 103, and outputs the voltage signal as a pixel signal.

In the case in which the transfer pulse signal PTXAn is H and PTXBn is L, only the charge of the first PD 101A is transferred to the FD region 103, and the A image signal can be read out via the amplifier 104. Also, when both the transfer pulse signals PTXAn and the PTXBn are controlled to H, the charges of the first PD 101A and the second PD 101B are transferred to the FD region 103. For this reason, the signal in which the A image signal is added to the B image signal, in other words the (A+B) image signal, can be read out via the amplifier 104. In the signal processing circuit 1103, the B image signal is calculated from the difference between the read-out A image signal and the (A+B) image signal, and a defocus amount is calculated by a widely-known phase difference operation.

The reset switch 105 is controlled by a reset pulse signal PRESn from the vertical scanning circuit 2, and the electrical potential of the FD region 103 is reset to a reference electrical potential VDD 108.

In the case in which an image with a high resolution such as that in still image shooting is required, one selection switch 106 in each column, in other words one row's worth, is controlled by a vertical selection pulse signal PSELn by the vertical scanning circuit 2. Then, the voltage signal amplified by the amplifier 104 is output to a vertical output line 107 as a pixel signal. The pixel signal output to the vertical output line 107 is read out to the readout circuit 3, and a signal output from the readout circuit 3 by the operation of the horizontal scanning circuit 4 is successively read out through the output amplifier 5. Similarly, a pixel signal from each unit pixel is read out by continuing the pattern of row n+1, row n+2, and so on. This readout is similar when the A image signal is read out (a third scan method) as well as when the (A+B) image signal is read out (a fourth scan method).

On the other hand, because an image with high temporal resolution is required in moving image shooting, several pixels in the vertical direction are selected simultaneously for the purpose of reducing the number of pixels for an increase in readout speed, and an arithmetic average is obtained. For example, in the case in which a color filter 302 is a primary color filter with the widely known Bayer arrangement, and three pixels are to be added, three selection switches 106 in each column are simultaneously turned ON by the vertical scanning circuit 2 using vertical selection pulse signals PSELn, PSELn+2, and PSELn+4, for example. In this way, a pixel signal in which the row n+2 is the pixel center of gravity is obtained, and the arithmetic average of the voltage signals is output to the vertical output line 107 via the amplifier 104. Also, to obtain the pixel output of the next row, vertical selection pulse signals PSELn+3, PSELn+5, and PSELn+7, for example, are simultaneously set to H by the vertical scanning circuit 2. The pixel center of gravity of the pixel signal in this case is a row n+5, and the pixel center of gravity occurs in three row intervals, and thus an image signal reduced to ⅓ in the vertical direction can be read out. This readout is similar when the A image signal is read out (a first scan method) as well as when the (A+B) image signal is read out (a second scan method).

Note that also when capturing a still image for which a high resolution is not required, readout need only be performed similarly to the readout method for moving image shooting.

Figure 5:
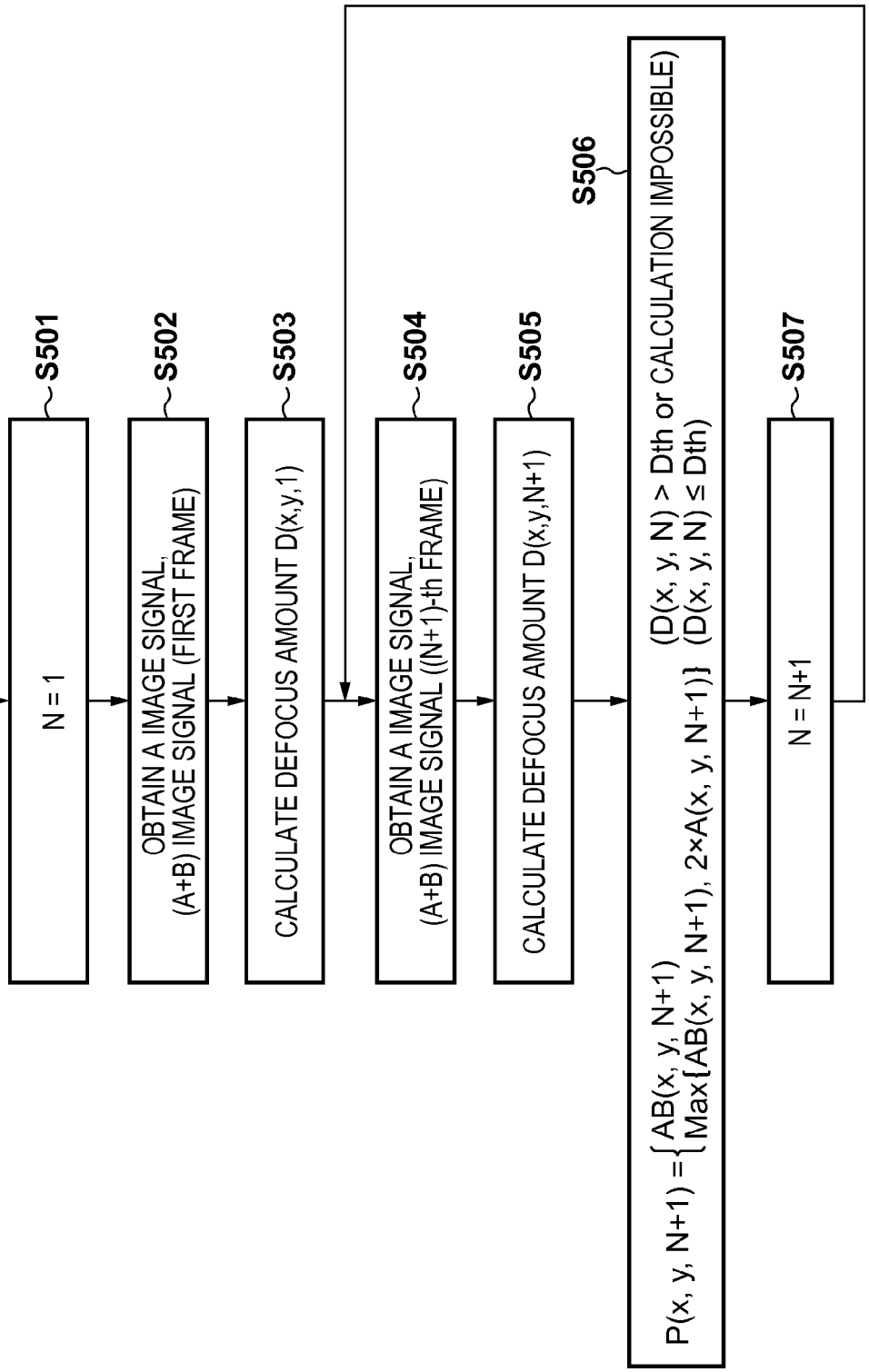
FIG. 5 is a flowchart showing processing according to a first embodiment.

Next, an image formation method according to the first embodiment will be explained using the flowchart in FIG. 5, taking moving image shooting as an example.

When a moving image start instruction is given, a number of frames N is reset to 1 in step S501. Next, in step S502, the A image signal and the (A+B) image signal of the first frame are obtained. Here, the A image signal output of the pixel at the coordinates (x, y) in the N-th frame is denoted by $A(x,y,n)$ and the (A+B) image signal output is denoted by $AB(x,y,N)$, and furthermore, the defocus amount is denoted by $D(x,y,N)$. Normally, a defocus amount is often defined for each region such as in FIG. 6, and therefore in that case the defocus amount is that of the region to which the pixel with corresponding coordinates belongs.

In step S503, a defocus amount $D(x,y,1)$ is calculated from the A image signal in the first frame, and the B image signal, which is the difference when the A image signal is subtracted from the (A+B) image signal. Then in step S504, the A image signal and the (A+B) image signal of the (N+1)-th frame (the second frame in the first routine) are obtained, and a defocus amount $D(x,y,N+1)$ is calculated in step S505.

In step S506, a final image signal $P(x,y,N+1)$ in the (N+1)-th frame is determined based on the defocus amount $D(x,y,N)$ of each pixel in the N-th frame. In the first embodiment, in the case in which the defocus amount $D(x,y,N)$ of an N-th frame is larger than a predetermined threshold value Dth or cannot be calculated, the following equation is used.

$$P(x,y,N+1)=AB(x,y,N+1)$$

Note that a threshold value Dth is appropriately set as a value that is regarded as being in focus or approximately in focus, or the like according to the focal length, the depth of field, etc., of the imaging lens 1111.

If the defocus amount $D(x,y,N)$ of the N-th frame is less than or equal to the threshold value Dth, then the following equation is used.

$$P(x,y,N+1)=\text{Max}\{AB(x,y,N+1),2\times A(x,y,N+1)\}$$

The above is performed on all pixel coordinates (x,y) related to image output for the (N+1)-th frame.

Note that the reason for using the defocus amount $D(x,y,N)$ of the previous frame is that, for communication time and operation processing reasons, it is difficult to immediately use the defocus amount $D(x,y,N+1)$ of the (N+1)-th frame. However, for example, in the case in which a still image with low resolution is processed, the defocus amount $D(x,y,N+1)$ of the (N+1)-th frame can also be used.

Normally in a region in which the defocus amount is small, the output of the A image signal and the output of the B image signal are approximately equal. However, if there is a large difference in signals between pixels that are targeted for pixel addition, there are cases in which the desired arithmetic average cannot be obtained, and the (A+B) image signal, which is the addition output of the two photodiodes 101A and 101B, appears more prominently. In view of this, the larger out of the signal output of the (A+B) image signal, which is the original image signal, and the doubled A image signal is to be the final image signal $P(x,y,N+1)$ of the (N+1)-th frame.

Then, until an instruction to end moving image shooting is given, the number of frames N is incremented in step S507, and the procedure returns to step S504.

As described above, by determining the pixel signal based on the defocus amount, a loss in dynamic range that occurs when an arithmetic average is output can be compensated for, without increasing power consumption.

Second Embodiment

Next, an image formation method in a second embodiment of the present invention will be described using the flowchart in FIG. 7. A difference from the first embodiment is the point that the operation for replacing the final image signal with a doubled A image signal in step S506 is performed on only G pixels in the second embodiment. Normally, the image sensor 1101 is matched to the human relative luminosity factor, and thus in the case in which the image sensor 1101 is covered with the primary color filter 302, the sensitivity of the G pixel is the highest. For this reason, when obtaining the arithmetic average, only the G pixels where loss of dynamic range is likely to occur are replaced. Note that the same step numbers have been allocated to processes in FIG. 7 that are similar to FIG. 5.

When an instruction is made to start moving image shooting, the number of frames N is reset to one in step S501. Next, in step S502 the A image signal and the (A+B) image signal in the first frame are obtained. In step S503, a defocus amount D(x,y,1) is calculated from the A image signal in the first frame, and the B image signal, which is obtained by subtracting the A image signal from the (A+B) image signal. Next in step S504, the A image signal and the (A+B) image signal of the (N+1)-th frame are obtained, and the defocus amount D (x,y,N+1) is calculated in step S505.

Next in step S706, a final image signal P(x,y,N+1) in the (N+1)-th frame is determined based on the defocus amount D (x,y,N) of each pixel in the N-th frame. In the second embodiment, in the image signal P(x,y,N+1), the R pixel is denoted by R(x,y,N+1), the G pixel is denoted by G (x,y, N+1), and the B pixel is denoted by B(x,y,N+1). For the R pixel and the B pixel, regardless of the defocus amount D(x,y,N), the AB(x,y,N+1) that is the (A+B) image signal of the (N+1)-th frame is used as is as the final image signal. On the other hand, for the G pixel, in the case in which the defocus amount D(x,y,N) of the N-th frame is larger than the threshold value Dth, or cannot be calculated, then the following equation is used.

$$G(x,y,N+1)=AB(x,y,N+1)$$

Also, if the defocus amount D(x,y,N) of the N-th frame is less than or equal to the threshold value Dth, the following equation is used.

$$G(x,y,N+1)=\text{Max}\{AB(x,y,N+1), 2\times A(x,y,N+1)\}$$

The above processing is performed on all pixel coordinates regarding image output in the (N+1)-th frame.

Also, until an instruction to end moving image shooting is given, the number of frames N is incremented in step S507, and the procedure returns to step S504.

As described above, the loss of dynamic range that occurs when outputting an arithmetic average by referring to the defocus amount is compensated for the G pixel, and the (A+B) image signal, which is the original image signal, is used as is as image output for the R pixel and the B pixel. Accordingly, image quality deterioration unique to the arithmetic average can be suppressed, while also stopping deterioration in image quality at the requisite minimum.

Third Embodiment

Next, the third embodiment of the present invention will be described. In the third embodiment, instead of the operation performed in step S506 of the first embodiment in which the final image signal is replaced with a doubled (a multiple of) A image signal, an operation in which the final image signal is replaced with the weighted average of the (A+B) image signal and the A image signal is performed, wherein the weighting is continuously changed between frames.

FIG. 8 is a table of conditions for calculating the final image signal P(x,y,N+1) in step S506 in the third embodiment. The "frame" column shows the state of the defocus amount in each frame with symbols, and the calculating formulas for the image signal P(x,y,N+1) for the corresponding conditions are listed in the right field.

For example, in the case in which the condition of the third row is that the defocus amount in two consecutive frames from the (N−1)-th frame is Dth or less, the value of P(x,y,N+1) is the larger out of AB(x,y,N+1) and {AB(x,y, N+1)+4×A(x,y,N+1)}/3. The latter value is the weighted average of the (A+B) image signal (x,y,N+1) and a doubled A image signal A(x,y,N+1), with a weighting of 1:2.

Accordingly, output of the (A+B) image signal AB(x,y, N+1), which is the original image signal, is always prioritized in the case in which it is the signal that is larger. However, if this image signal is not larger, the longer frames with the defocus amount less than or equal to Dth continue, i.e., frames in focus, the more the weighting is changed so as to gradually approach double the output of the A image signal.

In this way, by determining the final pixel signal using defocus amounts that correspond to multiple frames, on top of effects similar to those in the first embodiment, feelings of strangeness towards sudden color changes in frames that follow an in-focus frame can be suppressed.

While the present invention has been described with reference to exemplary embodiments, it is to be understood that the invention is not limited to the disclosed exemplary embodiments, and various variations and modifications can be made within the scope of the gist of the present inventions. In the first to third embodiments described above, the A image signal has parallax, and has low sensitivity compared to the (A+B) image signal, and thus the configuration is such that the (A+B) image signal is replaced with the A image signal based on the defocus amount obtained from the image sensor. However, similar effects can be obtained even in a configuration in which the (A+B) image signal is replaced with the A image signal based on the defocus amount obtained from a phase difference sensor arranged in an imaging optical system that is different from the image sensor.

The scope of the following claims is to be accorded the broadest interpretation so as to encompass all such modifications and equivalent structures and functions.

This application claims the benefit of Japanese Patent Application No. 2014-183496, filed on Sep. 9, 2014 which is hereby incorporated by reference herein in its entirety.

What is claimed is:

1. An image capturing apparatus comprising:
an image sensor including a plurality of unit pixels each having a plurality of photoelectric conversion portions for one out of a plurality of microlenses;
a readout circuit that is capable of reading out pixel signals by scanning the image sensor with a first scan method of adding and reading out signals from a portion of the plurality of photoelectric conversion portions by a predetermined number of unit pixels, and a second scan method of adding and reading out signals from the plurality of photoelectric conversion portions by the predetermined number of unit pixels;
a control/operation circuit configured to perform the functions of:
a detection unit that obtains a defocus amount; and
a controller that forms an image by determining, for each read out pixel signal, to use a pixel signal read out with the second scan method in a case in which the defocus amount is larger than a predetermined threshold value, or a larger signal out of the pixel signal read out with the second scan method and a signal obtained by using the pixel signal read out with the first scan method in a case in which the defocus amount is less than or equal to the predetermined threshold value.

2. The image capturing apparatus according to claim 1, wherein in the case in which the defocus amount is less than or equal to the threshold value, the controller determines to use a larger signal out of the pixel signal read out with the second scan method and a signal obtained as a plural factor of the pixel signal read out with the first scan method.

3. The image capturing apparatus according to claim 1, wherein the plurality of unit pixels are covered by a primary color filter, and
the controller, in a case of R and B pixel signals, determines to use the pixel signal read out with the second scan method regardless of the defocus amount, and in the case of a G pixel signal, performs the determination based on the defocus amount.

4. The image capturing apparatus according to claim 1, wherein in the case in which the defocus amount is less than or equal to the threshold value, the controller determines to use a larger signal out of the pixel signal read out with the second scan method and a signal that is a weighted average of the pixel signal read out with the first scan method and the pixel signal read out with the second scan method.

5. The image capturing apparatus according to claim 4, wherein the controller changes weighting of the weighted average based on defocus amounts that correspond to a plurality of frames, and increases a weight of the pixel signal read out with the first scan method as long as the defocus amount for each of the plurality of frames continues to be less than or equal to the threshold value.

6. The image capturing apparatus according to claim 1, wherein the detection unit calculates a defocus amount based on the pixel signal read out with the first scan method and the pixel signal read out with the second scan method.

7. The image capturing apparatus according to claim 1, wherein the detection unit has a photoelectric conversion portion that is different from the image sensor, and obtains the defocus amount based on a signal obtained from the different photoelectric conversion portion.

8. The image capturing apparatus according to claim 1, wherein the image capturing apparatus can perform still image shooting and moving image shooting, and
in the moving image shooting, the readout circuit performs scanning with the first scan method and the second scan method, and in the still image shooting, performs scanning with a third scan method in which a signal is read out from a portion of the plurality of photoelectric conversion portions from each of the plurality of unit pixels, and performs scanning with a fourth scan method in which signals from the plurality of photoelectric conversion portions are added and read out from each of the plurality of unit pixels.

9. The image capturing apparatus according to claim 8, wherein, in the moving image shooting, the controller performs the determination based on the defocus amount obtained at a timing of one frame prior.

10. A method of controlling an image capturing apparatus that has an image sensor including a plurality of unit pixels each having a plurality of photoelectric conversion portions for one out of a plurality of microlenses, the method comprising:
reading out pixel signals by scanning the image sensor with a first scan method of adding and reading out signals from a portion of the plurality of photoelectric conversion portions by a predetermined number of unit pixels;
reading out pixel signals by scanning the image sensor with a second scan method of adding and reading out signals from the plurality of photoelectric conversion portions by the predetermined number of unit pixels;
obtaining a defocus amount; and
determining, for each read out pixel signal, to use a pixel signal read out with the second scan method in a case in which the defocus amount is larger than a predetermined threshold value, or a larger signal out of the pixel signal read out with the second scan method and a signal obtained by using the pixel signal read out with the first scan method in a case in which the defocus amount is less than or equal to the predetermined threshold value for forming an image.

* * * * *